United States Patent [19]

Somerville et al.

[11] Patent Number: 4,877,039

[45] Date of Patent: Oct. 31, 1989

[54] GRAIN CLEANER

[76] Inventors: Dean S. Somerville, P.O. Box 215, McHenry, N. Dak. 58464; Curtis T. Stokkeland, Route #1, Box 21, Cooperstown, N. Dak. 58425

[21] Appl. No.: 237,510

[22] Filed: Aug. 26, 1988

[51] Int. Cl.⁴ ........................................ A01F 12/30

[52] U.S. Cl. ........................................ 460/97; 460/79

[58] Field of Search .................. 130/23, 27 Z, DIG. 4

[56] References Cited

U.S. PATENT DOCUMENTS

| | | | |
|---|---|---|---|
| 1,781,472 | 11/1930 | Nagle | 130/23 |
| 2,670,845 | 3/1954 | Busack et al. | 130/27 Z |
| 4,464,887 | 8/1984 | Decoene et al. | 130/27 Z X |
| 4,770,190 | 9/1988 | Barnett | 130/27 Z |

*Primary Examiner*—Thuy M. Bui
*Attorney, Agent, or Firm*—Robert E. Kleve

[57] ABSTRACT

The invention comprises a grain cleaning apparatus having a frame with a plurality of augers mounted beside one another in parallel relation. Screens surround the augers except at the ends of the augers to allow grain to enter and leave at the ends of the augers. A boxlike frame encloses the rearward ends of the augers with an open top to allow grain to be cleaned to be dumped into the open rear ends of the augers. A motor is provided with drive member to rotate the augers simultaneously whereby the augers will auger the grain from the box along the augers within the screens to the forward end of the frame, a chute is provided at the forward end for the grain to leave the frame after traveling along the augers. The mesh of the screens is smaller than the grain so as to retain the grain within the screens as it travels along. The mesh allows foreign particles and chaff smaller than the size of the openings to pass through the openings and drop downward from the screens. A bin is provided beneath the screened augers to collect the smaller particles and another auger is provided in the bin to auger the particles out of the bin.

3 Claims, 3 Drawing Sheets

FIG. 5
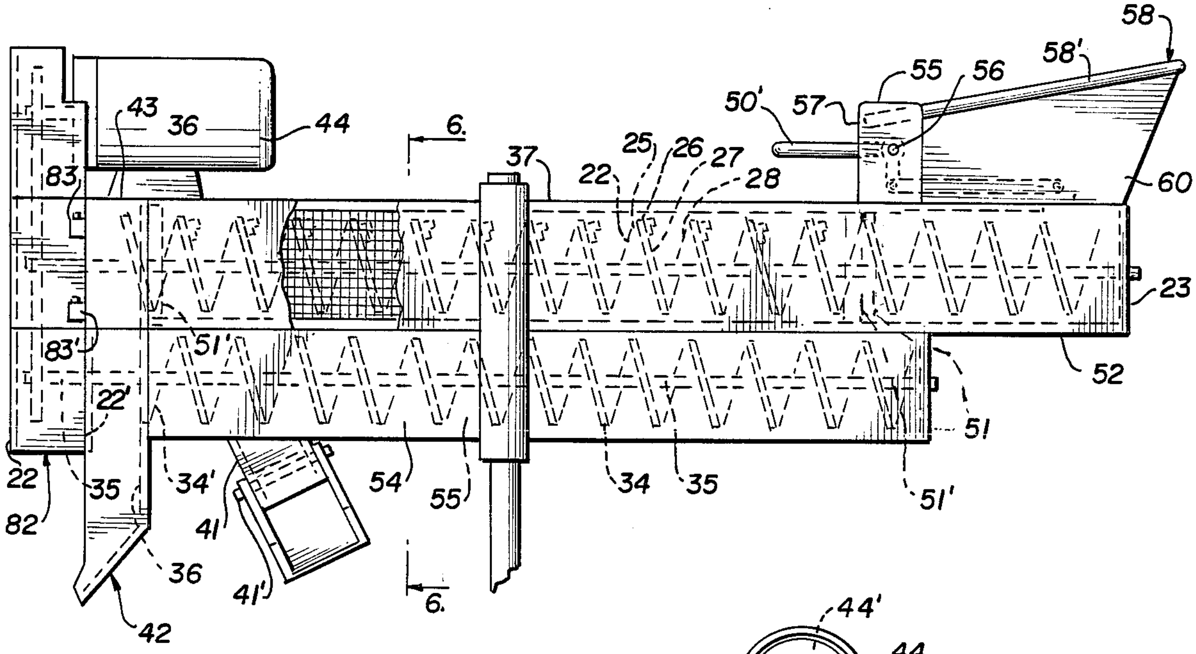
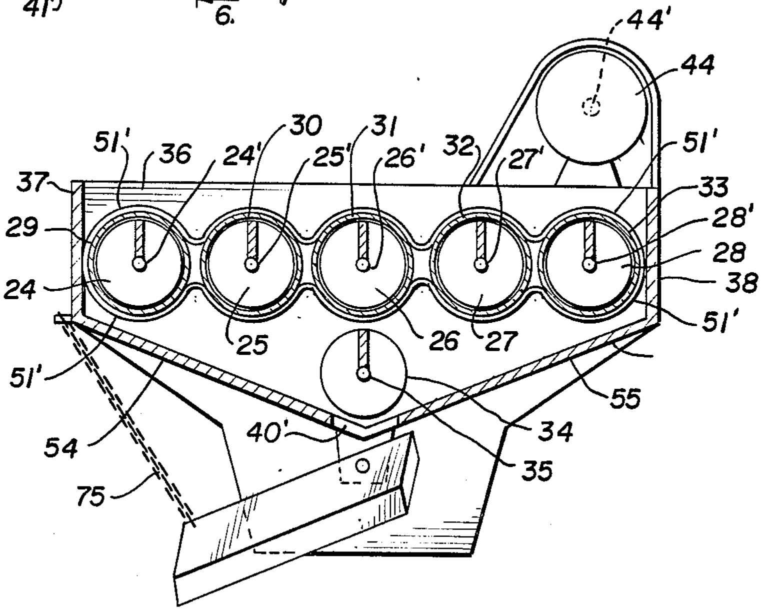
FIG. 6

FIG. 3
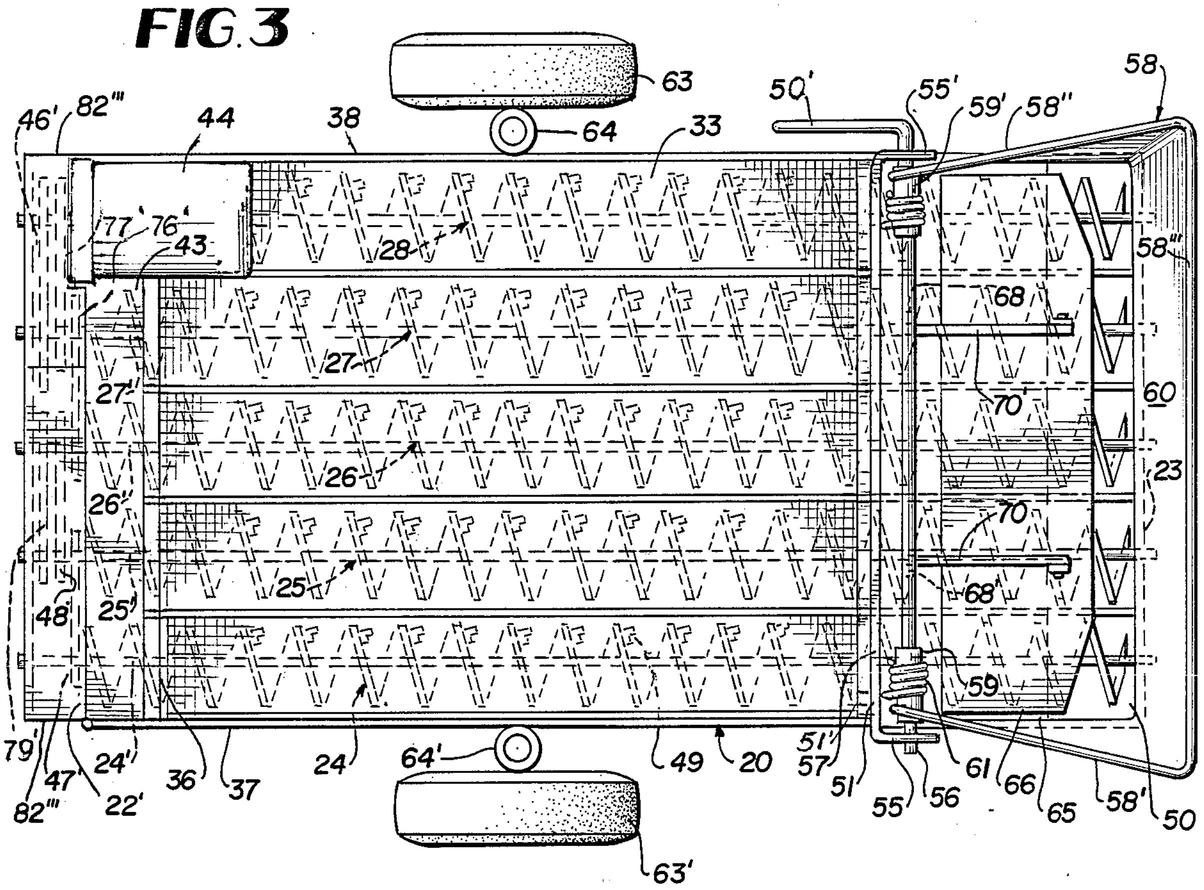
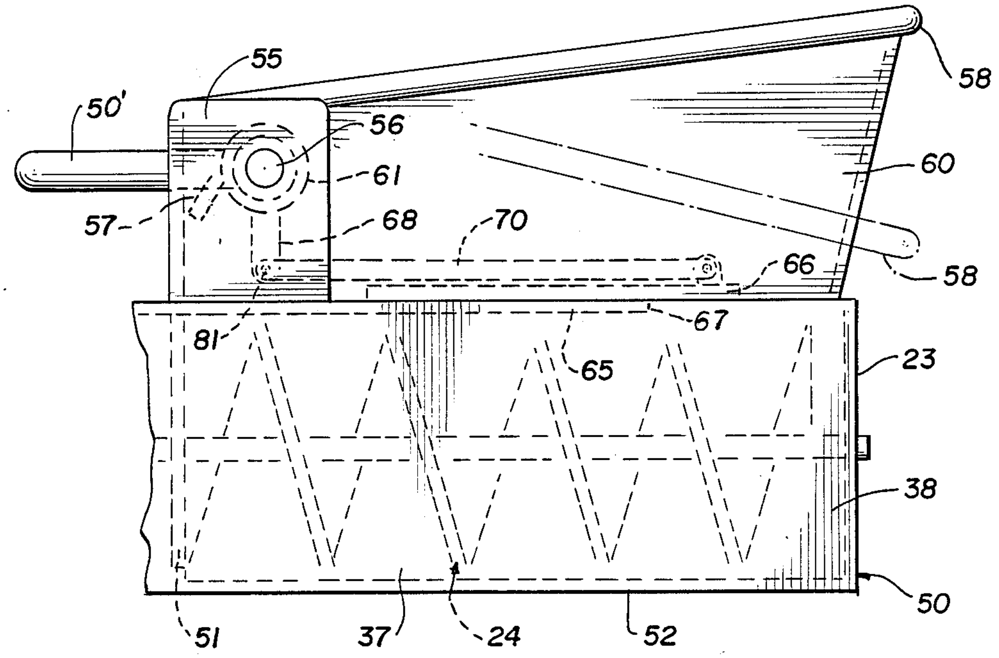
FIG. 4

GRAIN CLEANER

This invention relates to cleaning apparatus, more particularly, the invention relates to grain cleaning apparatus.

It is an object of the invention to provide a novel cleaning apparatus for cleaning grain rapidly and thoroughly.

It is another object of the invention to provide a novel grain cleaning apparatus having a plurality of parallel augers with screens surrounding the augers for augering grain simultaneously in the augers from one end of the augers to the other end, with the screens having openings smaller than the customary size of the grain, so as to be retained in the augers and augered out the forward ends of the augers, but allowing chaff and other non-grain particles, smaller than the openings, to fall through the openings in the screens to clean the grain being augered therethrough.

It is another object of the invention to provide several sreen augers for simultaneously cleaning the grain more quickly.

It is a further object of the invention to provide a novel grain cleaning device for cleaning the grain rapidly by separating the grain from foreign particles rapidly or quickly.

Further objects and advantages of the invention will become apparent as the description proceeds and when taken in conjunction with the accompanying drawings wherein:

FIG. 3 is a top view of the cleaning apparatus.

FIG. 4 is an enlarged fragmentary side view of the apparatus.

FIG. 5 is a side view similar to FIG. 1.

FIG. 6 is a rear view taken along line 6—6 of FIG. 5.

Briefly stated, the invention comprises a grain cleaning apparatus or device having a frame with a plurality of parallel augers mounted in the frame for simultaneously augering grain from one end of the augers to the other end of the augers for cleaning the grain while augering. Said plurality of augers being surrounded by cylindrical screens, said screens having openings in their mesh smaller than the size of grain so as to retain the grain about the auger and cause the grain to move forward in the screens by the augering action and travel out the screens at the forward end of the auger, said screens allowing chaff and other foreign particles smaller than the openings in the mesh to travel out through the openings to clean the grain, with said smaller particles gravitating into a bin beneath the screened augers, an auger in the bin for augering the smaller particles from the bin out the forward end of the frame.

Figure 1:
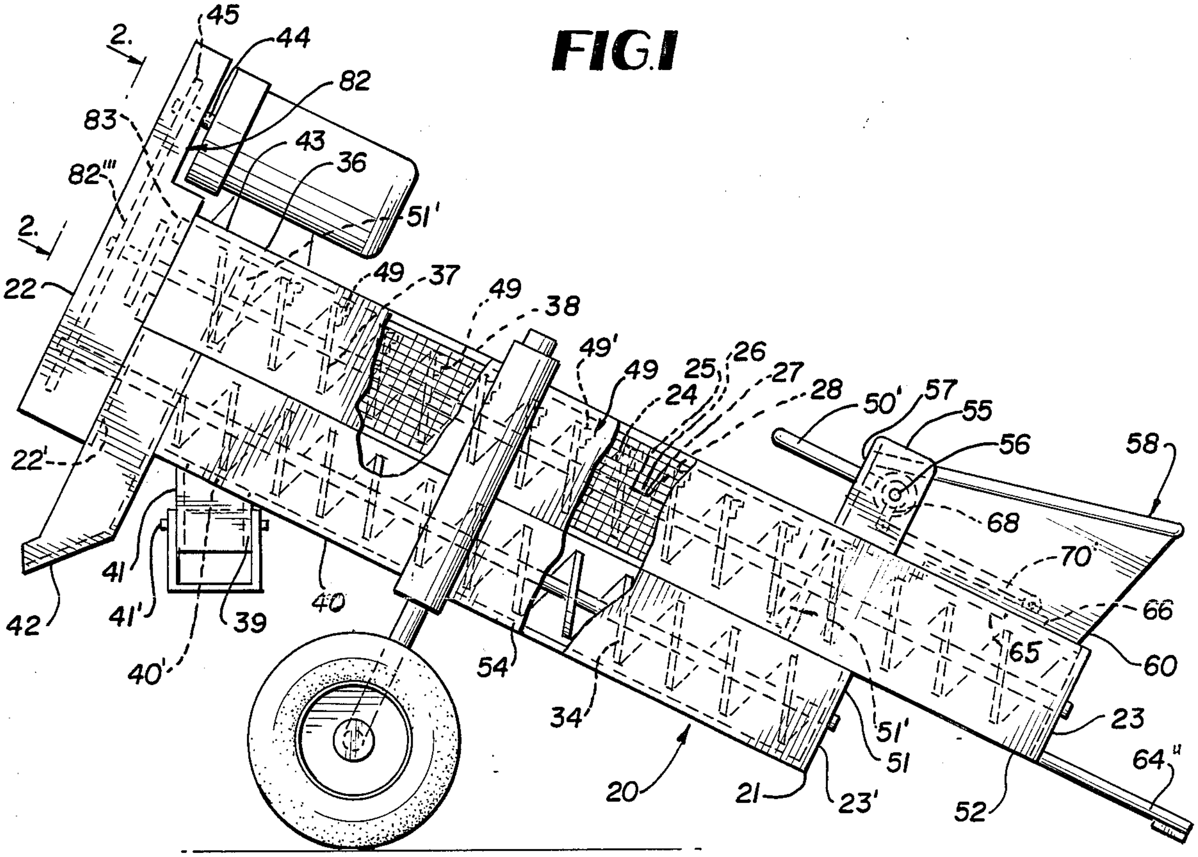
FIG. 1 is a side elevational view of the grain cleaning apparatus.
Figure 2:
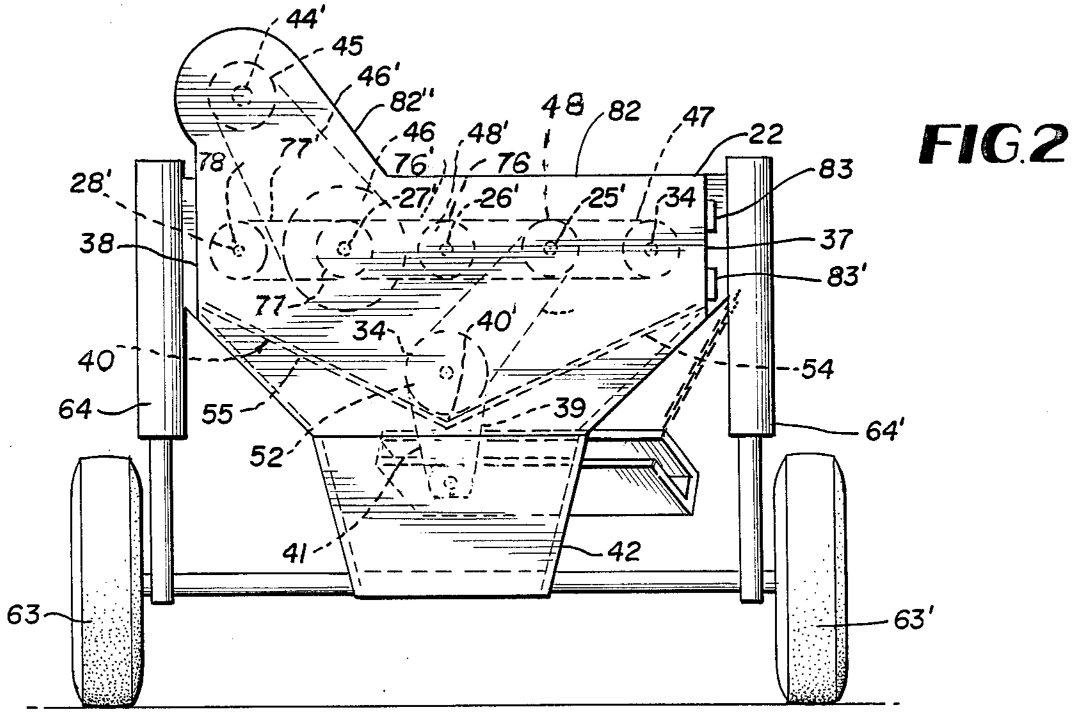
FIG. 2 is a front view of the grain cleaning apparatus perpendicular to the length of the apparatus and taken along line 2—2 of FIG. 1.

Referring more particularly to the drawings in FIG. 1 the grain cleaning device 20 is illustrated having a rectangular frame 21 with front and rear walls 22' and 23 and with five augers 14–28 in the frame having their front shaft ends 24'–28' rotatably mounted in the front wall 22', and the rear shaft end portions 24"–28" rotatably mounted in the rear wall 23. The five augers 24–28 each have cylindrical screens 29–33 surrounding the augers 24–28. A bin area 40 is provided beneath the five augers and a sixth auger 34 has a shaft 35 with the front end of the shaft rotatably mounted to the front wall 22' and the rear end of the shaft 35 rotatably mounted to the rear wall 23.

The shaft 35 of auger 34 is mounted in the same front walls however the auger 34 has it's forward end 34 terminating short of the front wall and adjacent a wall 36 mounted between side panels 37 and 38 and spaced rearward of the front wall. A spout 39 is mounted on an opening 40' in the bottom of the bin 40 and a pivotally mounted chute 41 has a pin 41' pivotally connecting the spout to the chute. The side panels 37 and 38 are fixed between the front and rear walls 22 and 23.

The upper screened augers have a chute 42' mounted to the bottom of the frame between the front wall 22' and the rear wall 36. The chute 42 collects and guides the grain received from the forward end of all five augers out through the chute to a location exterior of the frame.

The frame 20 has a top panel 43 which extends across the top of the screens at the forward end of the frame and is mounted to the front wall, and an electric motor 44 is mounted to the top panel.

The motor 44 has a variable speed pulley 45 mounted to its shaft 44'. The screened auger 27 has a pulley 46 mounted to its shaft portion 27" and an endless belt 46' connects the pulley 45 of the motor 44 with the pulley 46 of the shaft 27" of the auger so that energizing the motor rotates the pulleys to rotate the auger 27. The augers 24–28 and auger 34 each also have gears 47, 48, 76–79 respectively fixed to their shafts at the forward ends with endless link chains 47'–48, 76', 77', 79' connecting gears 47–48, 76–79 together in driving relation so that rotation of auger 25 with the rotation of its gear 48, through the endless chains rotating gears 47–48, 76–79, rotates the other augers 24, 25, 26, 27, and 28 when the electric motor is energized and driving auger 25.

The screened augers 24–28 each have lugs 49 formed into a L-shape with one end 49' fixed to the auger blades and the other end 49" projecting laterally away from the auger blades. The lugs 49 are mounted at 180 degree intervals on the screened portion of auger blades and act to agitate the grain as the grain is being moved along by the rotation of the auger to cause foreign particles and other small matter on the grain being augered to more readily separate from the grain and travel more easily thru openings in the mesh of the cylindrical screen that surround the augers.

The rear ends of the augers 24–28 have a rectangular box like area or portion 50. The five cylindrical screens 29–33 of the five augers do not extend rearwardly into the box like portion 50, but terminate in a wall portion 51 at the forward end of the box like portion, so that grain may be dumped into the box like area 50 and fall directly into the rotating augers where it can be augered forward through openings in the wall 51 into and along the inside of the screens, out the forward ends into the chute.

The grain cleaning apparatus by providing five augers simultaneously augering the grain through the sleeves for simultaneously cleaning the grain by means of the five cylindrical screens provides a considerably more rapid method of cleaning the grain by providing a common input in the box like opening for introducing grain to be cleaned and having a common outlet chute for the grain after it has been cleaned.

The cylindrical screens have a mesh smaller than the size of grain so as to retain the grain within the sleeves while allowing foreign particles and other small matter, smaller than the size of the openings in the mesh of the screens, to pass through and the augering and agitating action of the augers assists in urging the foreign particles and other small matter through the openings in the screens. Since the size of the grain may vary it is intended that the mesh be smaller than at least a large majority of the grain being handled. However, it is contemplated to provide screens in several different size meshes for different size grain. Also, by providing a variable speed pulley on the motor, the speed of the motor output can be varied if desired so that the augers can be rotated faster or slower. If there is a considerable amount of grain that is smaller than the mesh, it may be desirable to run the augers faster so that less small grain will pass through the openings. However, it has been found that when rotating the augers slower less damage to the grain or other seed being cleaned occurs, so that in some instances it may be desired to run the augers slower.

At the rear end of the augers a bottom panel 52 extends across the bottom of the side panels 37 and 38 to provide a bottom, which together with the side walls 37 and 38 and rear wall 23 form the box like enclosure.

Inclined converging walls 53 and 54 form a bin beneath the screened augers to receive and collect the foreign particles and other small matter separated from the grain through the screen opening or openings in the mesh of the screened augers augering the grain therethrough for cleaning. The auger 34 will auger these foreign particles and other small matter forward in the bin where it may gravitate out through the chute 41 in the bottom of the bin, formed rearward and separate of the grain chute 42. The chute 41 is separated from the grain chute by the wall 36 fixed between the side panels 37 and 38. The auger shaft 35 extends through the wall 36 in rotatable relation, however, the front end of blade 34' of the auger terminates behind it. The wall 22' in front of wall 36 forms the front of the grain chute 42., and the motor drive is located betwee the walls 22 and 22'. The side walls 37 and 38 form the upper portion of the side of the grain chute.

A pair of mounting flanges 55 and 55' are fixed to the side panels 37 and 38 on opposite sides of the box like area at the rear of the frame. A rod 56 is rotatably mounted to the side panels 55 and 55'. A short panel 57 extends across the frame, in front of the flanges 55 and 55'. A U shaped rod 58 has its ends fixed to sleeves 59 and 59', which sleeves are rotatably mounted on the rod 56, so that the U rod 58 may pivot upward and downward about the rod 56 by the sleeve rotation. A flexible resilient panel 60 has its upper edge attached to the side arm portions 58' and 58" of the U rod and the rear portion 58''' of the U rod to form a flexible enclosure about three sides of the opening 50. A pair of coil springs 61 and 61' are mounted on the sleeves 59 and 59' and have their one ends engaged against the panel 57 and there other ends fixed to the sleeves 59 and 59' to urge the U rod 58 pivoted upward counterclockwise about its axis and maintain the U rod pivoted upward as illustrated in solid lines in FIG. 6 with the panel 60 relatively straight. However, when an implement is used to dump grain into the augers within the confines of the panel 57 and the U rod at the rear of the augers, the implement may engage the U rod 58 and the U rod being spring mounted may pivot downward clockwise about the axis of rod 56 to prevent damage to the implement, U rod, or panel 60, and the panel 60 can flex downward with the downward pivoting, if the implement should move down too hard against the U rod, and spring back upward afterward to its former position.

The frame has a pair of wheel supports 64 and 64' fixed to the side walls 37 and 38 and a pair of wheels 63 and 63' rotatably mounted to the supports for rotatably supporting the device. A towing hitch 64" is mounted to the rear panel 23 of the device, by being detachably mounted to the rear panel 23.

The chute 41 can be pivoted downward about the pin to release the foreign particles and othe small matter collected in the bin off to the side of the frame from within the bin. A chain 75 is provided to secure the chute in place.

A fixed plate 65 covers a portion of the rear ends of the augers within the enclsoure 50 it being fixed between the side plate 37 and 38. A sliding plate 66 is slidably mounted over the top of the fixed plate to vary the size of the opening into the augers between the rear edge 67 of the sliding plate and the rear wall 23. A pair of lugs 68 extend downward from the rod 56 and are fixed thereto and a pair of rods 70 and 70' are pivotally mounted at their one ends 81 to the lugs at their lower end and fixed to the sliding plate 66 at their other ends. A lever or handle 50' fixed to the rod enables an operator to rotate the rod 56 in one direction with the lugs pivoting with the rod and with the pivotal connection with rods 70 and 70' moving the rods in a generally horizontal direction and the rods moving the sliding plate 66 forward and rearward over the fixed plate, to vary the size of the opening to the augers and thereby vary the rate of flow of grain into the augers from the enclosure. A pivotal connection could be provided between the rods 70 and 70' and the sliding plate however for this type of construction if was found unnecessary. Walls 36 and 51 have openings for the sugers 24–28 to pass rotatably through and C shaped brackets 51' fixed to the walls supporting the front and rear ends of the screens.

The front wall 22' forms a cover 22 across the front of the wall 22 and encloses the drive to the augers. The cover 22 or wall has a horizontal strip 82', a curved upper strip 82" and side strips 82''' fixed together with the wall portion 22'. A pair of hinges 83 and 83' pivotally mount the cover 22 to the wall 22', so that the cover can be pivoted open to provide access. A conventional latch means is provided, not shown, to lock the cover closed.

It will be obvious that various changes and departures may be made to the invention without departing from the spirit and scope thereof, and accordingly, it is not intended that the ibvention be limited to that specifically described in the specification or as illustrated in the drawings but only as set forth in the appended claims wherein;

What is claimed is:

1. A grain cleaning device comprising a frame, a plurality of augers mounted to said frame beside one another in parallel relation, cylindrical screens surrounding the augers with the ends of the augers being open and free of the screens to allow access to the ends of the augers, a motor means to rotate the augers simultaneously, a box-like structure at the rearward ends of the augers to guide grain into the open rearward ends of the augers, said screens having mesh openings of a size slightly smaller than the size of the grain being cleaned, whereby grain may be dumped into the box-like structure at the rearward ends of the augers and will be augered simultaneously by all the augers along the augers and retained within the screens to the forward ends of the augers and out the forward ends of the screens and augers, while foreign and other non-grain particles of a size smaller than the size of the mesh openings will be allowed to pass through the mesh openings in the screens and gravitate downward from the screened augers, to thereby clean the grain, a bin beneath the screened augers to collect said particles, a chute at the forward end of the augers whereby the grain may travel down the chute at the forward end of the augers to the exterior of the frame.

2. A grain cleaning device according to claim 1, wherein a bin auger is mounted in the bin beneath the screened augers with said motor means also powering said bin augers, a second chute at the forward end of the bin auger whereby the bin auger may auger particles collected in the bin toward where they may gravitate out said second chute of said frame.

3. A grain cleaning device according to claim 2, wherein lugs are mounted to said augers and project outwardly therefrom said augers to agitate the grain being augered to facilitate the separation of foreign material from the grain and its passage through the screens.

* * * * *